(12) United States Patent
Pizio

(10) Patent No.: US 12,117,875 B1
(45) Date of Patent: Oct. 15, 2024

(54) LAPTOP COMPUTER INCLUDING AN INTEGRATED SUPPORT DEVICE

(71) Applicant: Dennis Pizio, Jupiter, FL (US)

(72) Inventor: Dennis Pizio, Jupiter, FL (US)

( * ) Notice: Subject to any disclaimer, the term of this patent is extended or adjusted under 35 U.S.C. 154(b) by 0 days.

(21) Appl. No.: 18/430,309

(22) Filed: Feb. 1, 2024

Related U.S. Application Data

(63) Continuation of application No. 18/116,256, filed on Mar. 1, 2023, now abandoned.

(60) Provisional application No. 63/315,690, filed on Mar. 2, 2022.

(51) Int. Cl.
  *G06F 1/16* (2006.01)
  *H01H 13/84* (2006.01)

(52) U.S. Cl.
  CPC .......... *G06F 1/1662* (2013.01); *H01H 13/84* (2013.01); *H01H 2217/034* (2013.01)

(58) Field of Classification Search
  None
  See application file for complete search history.

(56) References Cited

U.S. PATENT DOCUMENTS

| | | | |
|---|---|---|---|
| 4,973,176 A | 11/1990 | Dietrich | |
| 4,976,407 A | 12/1990 | Schwartz et al. | |
| 5,004,196 A | 4/1991 | Gross | |
| 5,074,511 A | 12/1991 | Wilson | |
| 5,125,606 A | 6/1992 | Cassano et al. | |
| 5,131,614 A | 7/1992 | Garcia et al. | |
| 5,490,647 A | 2/1996 | Rice | |
| 6,216,988 B1 * | 4/2001 | Hsu | G06F 1/1616 248/118.1 |
| 6,396,478 B1 | 5/2002 | Kravtin et al. | |
| 6,494,418 B1 * | 12/2002 | Wolf | G06F 3/0395 248/118 |
| 9,927,890 B1 | 3/2018 | Perlman | |
| 2010/0090953 A1 | 4/2010 | Loomis | |
| 2017/0010683 A1 * | 1/2017 | Pizio | G06F 3/039 |
| 2019/0179366 A1 * | 6/2019 | Ferber | G06F 3/03547 |
| 2021/0015252 A1 * | 1/2021 | Jesus | A47B 21/0371 |

* cited by examiner

*Primary Examiner* — Kenneth Bukowski
(74) *Attorney, Agent, or Firm* — John Rizvi; John Rizvi, PA—The Patent Professor®

(57) ABSTRACT

A laptop computer that includes a keyboard integrated into a body thereof, and a support device integrated into the body adjacent to the keyboard. The support device is configured to transition between a first position wherein at least a portion of the support device is protruding from the body and a second position wherein some or all of the support device is within a compartment of the body. The support device may be used to support at least a wrist or a hand of a user while in the first position and while the user is typing on the keyboard.

20 Claims, 14 Drawing Sheets

LAPTOP COMPUTER INCLUDING AN INTEGRATED SUPPORT DEVICE

CROSS-REFERENCE TO RELATED APPLICATIONS

This application is a Continuation in Part of U.S. patent application Ser. No. 18/116,256, filed on Mar. 1, 2023, which in turn claims the benefit of U.S. Provisional Patent Application Ser. No. 63/315,690 filed on Mar. 2, 2022, which are incorporated by reference herein in their entirety.

FIELD OF THE INVENTION

The present invention relates generally to ergonomic devices for laptop computers, and more particularly, to a support device integrated into a laptop computer that is capable of supporting a user's wrist(s) and/or hand(s) while the user is typing on a keyboard of the laptop computer.

BACKGROUND OF THE INVENTION

Computers have long since become an indispensable tool for many modern jobs. It is common for office workers to spend most of their waking hours sitting at a desk typing on a computer. This widespread adoption of computers has led to an increase in certain types of injuries. Many computer users experience pain or fatigue in their hands, wrists, arms, shoulders, upper back, or neck which may be related to their use of a computer, especially those who spend significant time each day working on a computer over the course of multiple years. In particular, it is believed that excessive use of standard computer keyboards can contribute to computer related injuries such as tendonitis, repetitive strain injury (RSI), and carpal tunnel syndrome.

Suggested methods for reducing the likelihood of computer related injuries include adjusting the positions of a computer's keyboard, pointing device (e.g., mouse), and monitor relative to the user. In addition, various products are commercially available that are intended to reduce the likelihood of developing such injuries. Such products may include nonstandard keyboards (e.g., ergonomic keyboards), separate padded wrist support devices, and wearable wrist braces.

Unfortunately, many of the above noted solutions are not applicable to users of laptop computers. While laptop computers are convenient for their compact size and portability, the fact that their peripheral devices are integrated into the body of the laptop computer significantly reduces a user's options for ergonomic adjustments since the users are unable to change the individual positions of the keyboard, pointing device, and monitor. Further, many laptop computers include an integrated keyboard and pointing device, wherein the pointing device is located between the user and the keyboard during use of the laptop computer. For such arrangements, it may not be possible to locate commercially available products such as padded wrist support devices in a proper position relative to the keyboard. For users of laptop computers, common advice for limiting the likelihood of computer related injuries include switching to a desktop computer or using a separate keyboard. Generally, such solutions may negate some or all of the benefits of using a laptop computer.

Accordingly, there is an established need for a device and/or a method that could reduce the likelihood of computer related injuries, especially for laptop computer users.

SUMMARY OF THE INVENTION

The present invention is directed to a convenient laptop computer that includes a keyboard integrated into a body of the laptop computer, and a support device integrated into the body adjacent to the keyboard. The support device is configured to transition between a first position wherein at least a portion of the support device is protruding from the body and a second position wherein some or all of the support device is within a compartment of the body. The support device may be used to support at least a wrist or a hand of a user while in the first position and while the user is typing on the keyboard.

In one implementation of the invention, a laptop computer comprises a keyboard integrated into a body of the laptop computer, and a support device integrated into the body adjacent to the keyboard. The support device is configured to transition between a first position wherein at least a portion of the support device is protruding from the body and a second position wherein some or all of the support device is within a compartment of the body. The support device is configured to support at least a wrist or a hand of a user while in the first position and while the user is typing on the keyboard.

In another implementation of the invention, a laptop computer may include a body and a support device. The body may include a lower portion and a keyboard integrated into the lower portion. The support device may be integrated into the body adjacent to the keyboard, and may include an elongated frame, one or more first biasing members, and one or more locking members. The elongated frame may be configured for the resting thereon of at least a wrist or a hand of a user. The one or more first biasing members may be configured to apply an upward force on the elongated frame to cause a rising of the elongated frame with respect to the lower portion of the body. The one or more locking members may be carried by the lower portion of the body. Each locking member may include a movable, respective latch member operable to change positions with respect to the lower portion of the body. The support device may be configured to selectively adopt a lowered and locked configuration and a raised and locked configuration. In the lowered and locked configuration, the elongated frame may be at least partially received within a compartment of the lower portion of the body, and the latch member of each locking member of the one or more locking members may engage the elongated frame and block the rising of the elongated frame thereby retaining the elongated frame in place. In the raised and locked configuration, the elongated frame may be elevated with respect to the lowered and locked configuration and at least part of the elongated frame may protrude upward from the lower portion of the body; furthermore, the latch member of each locking member of the one or more locking members may engage the elongated frame and block a lowering of the elongated frame thereby retaining the elongated frame in place, and the protruding part of the elongated frame may provide a support for at least a wrist or a hand of a user while the user is typing on the keyboard.

In another aspect, the body may include an upper portion coupled to a lower portion with a display screen integrated into the upper portion of the body and the keyboard and support device integrated into the lower portion of the body.

In another aspect, the laptop computer can include a pointing device integrated into the body thereof and the support device may be located between the keyboard and the pointing device.

In another aspect, the support device may include an elongated bar extending across the body in a longitudinal direction thereof.

In another aspect, the support device may include a cushioning material on an exterior surface thereof configured to contact the wrist or the hand of the user when the support device is supporting the wrist or the hand.

In another aspect, the support device may include legs extending from the elongated bar into the compartment and coupling the elongated bar to the body.

In another aspect, the support device may be coupled to the body via a push-to-open mechanism configured to release the support device from the second position upon pressure applied to the support device, maintain the support device in the first position with a biasing member sufficient to support the wrist or the hand of the user, and secure the support device in the second position upon pressure applied to the support device that is sufficient to overcome the biasing member and locate the support device in the compartment.

In another aspect, the support device may be coupled to the body via a mechanism configured to release the support device from the second position upon actuation of a push button located on the body, maintain the support device in the first position with a biasing member sufficient to support the wrist or the hand of the user, and secure the support device in the second position upon pressure applied to the support device that is sufficient to overcome the biasing member and locate the support device in the compartment.

In another aspect, the support device may be coupled to the body via a mechanism configured to be manually actuated between the first position and the second position while providing sufficient support to maintain the support device in the first position while the wrist or the hand of the user rests thereon.

In another aspect, the support device may be configured to protrude from the body while in the first position to an extent sufficient to promote ergonomic positioning of the wrist or the hand of the user relative to the keyboard while the user is typing on the keyboard.

In another aspect, a method of using a laptop computer having a body with a keyboard integrated therein may include transitioning a support device that is integrated into the body adjacent to the keyboard between a first position wherein at least a portion of the support device is protruding from the body and a second position wherein some or all of the support device is within a compartment of the body, and typing on the keyboard while simultaneously supporting a wrist or a hand on the support device while the support device is in the first position.

In a second aspect, the body may include an upper portion coupled to a lower portion with a display screen integrated into the upper portion of the body and the keyboard and support device integrated into the lower portion of the body, wherein the method may include folding the upper portion and the lower portion of the body to close the laptop computer.

In another aspect, the method may include using a pointing device integrated into the body and the support device may be located between the keyboard and the pointing device.

In another aspect, the method may include supporting the hand or the wrist on an elongated bar of the support device extending across the body in a longitudinal direction thereof.

In another aspect, the method may include supporting the hand of the wrist on a cushioning material on an exterior surface of an elongated bar of the support device extending across the body in a longitudinal direction thereof.

In another aspect, the method may include supporting the elongated bar on legs extending therefrom into the compartment and coupling the elongated bar to the body therewith.

In another aspect, the method may include releasing the support device from the second position by pressing on the support device, maintaining the support device in the first position with a biasing member sufficient to support the wrist or the hand, and securing the support device in the second position by pressing on the support device sufficient to overcome the biasing member and locate the support device in the compartment.

In another aspect, the method may include releasing the support device from the second position by actuating a push button located on the body, maintaining the support device in the first position with a biasing member sufficient to support the wrist or the hand, and securing the support device in the second position by pressing on the support device sufficient to overcome the biasing member and locate the support device in the compartment.

In another aspect, the method may include manually actuating the support device between the first position and the second position while providing sufficient support to maintain the support device in the first position while the wrist or the hand rests thereon.

In another aspect, the method may include supporting the wrist or the hand on the support device while in the first position such that the wrist or the hand is in an ergonomic position relative to the keyboard while the user is typing on the keyboard.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
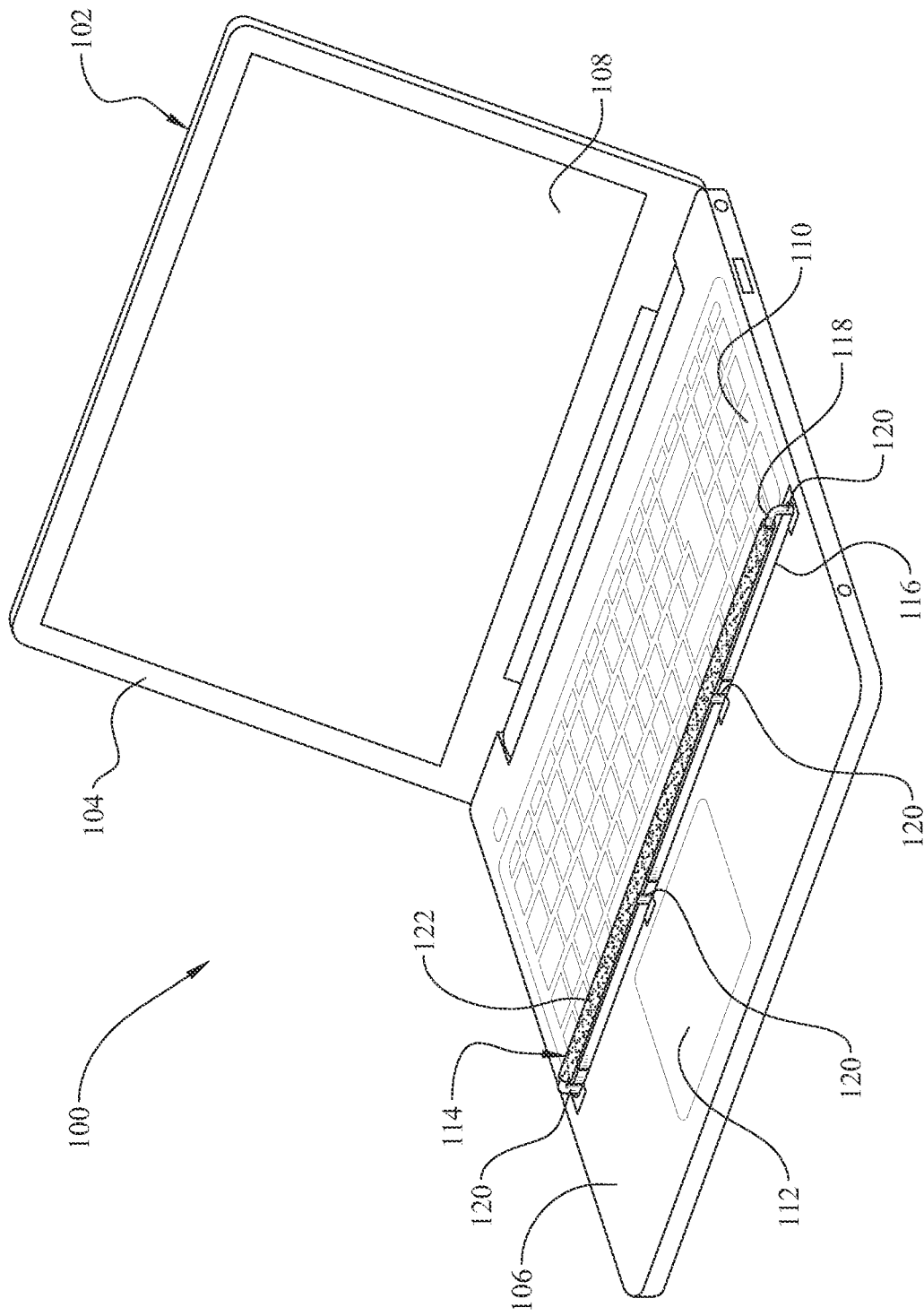
FIG. 1 presents a perspective view of a laptop computer comprising an integrated support device located in a first position in accordance with a first embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and economical support device for a laptop computer that is capable of supporting a user's wrist(s) and/or hand(s) while the user is typing on a keyboard integrated into the laptop computer in an ergonomic manner intended to reduce the likelihood of computer related injuries, such as tendonitis, repetitive strain injury (RSI), and carpal tunnel syndrome.

Referring initially to FIGS. 1 through 5, a laptop computer 100 (referred to hereinafter as the laptop 100) is presented that includes a clam shell-type body 102 having an upper portion 104 pivotally coupled to a lower portion 106 that may be folded shut for transportation. A display screen 108 is integrated into the upper portion 104 of the body 102, and an alphanumeric keyboard 110 and a pointing device 112 (e.g., a touch pad or a track pad) are integrated into the lower portion 106 of the body 102. A central, longitudinal axis of the keyboard 110 is parallel to a central, longitudinal axis of the display screen 108. The pointing device 112 is generally centrally located between the user and the keyboard 110 during use of the laptop 100. In addition, the laptop 100 includes a support device 114 integrated into the lower portion 106 of the body 102 between the keyboard 110 and the pointing device 112 that is configured to support one or both of a user's wrists and/or hands while in the user is typing on the keyboard 110, as presented in FIGS. 3 and 5.

In the nonlimiting embodiment presented in the figures, the support device 114 includes a frame 115 comprising an elongated bar 118 that extends across the lower portion 106 and has a central, longitudinal axis that is parallel with the central, longitudinal axes of the keyboard 110 and the display screen 108. The frame 115 includes legs 120 that extend from the elongated bar 118 into a recess or compartment 116 of the lower portion 106 of the laptop 100 and couple the frame 115 therein. Optionally, a cushioning material 122 may be located on an exterior surface of the elongated bar 118 or portions thereof that are configured to contact the wrists or the hands of the user when resting on the support device 114. Such cushioning material 122 may be permanently or releasably coupled to the elongated bar 118.

Figure 2:
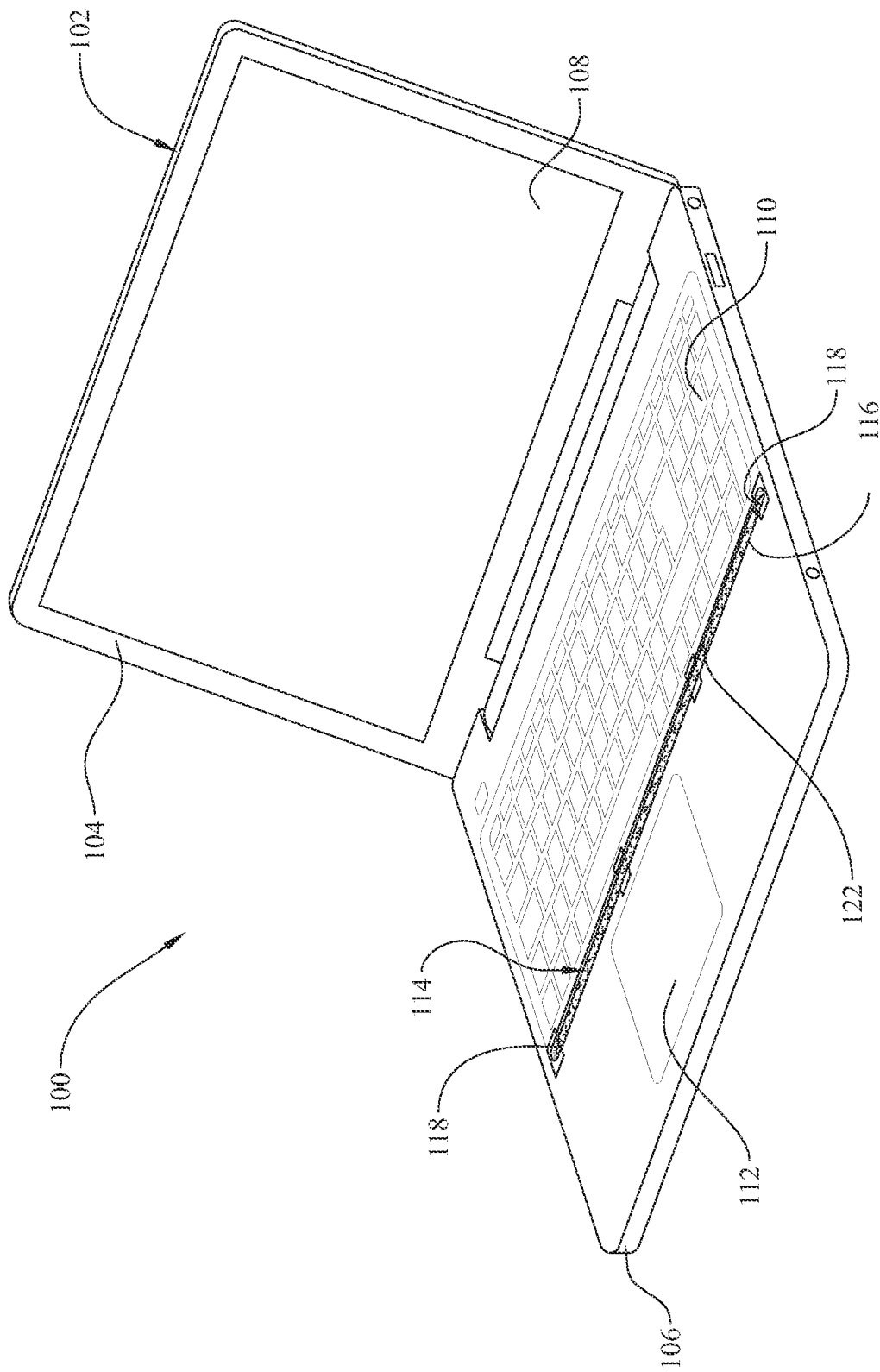
FIG. 2 presents a perspective view of the laptop of FIG. 1 with the support device in a second position.
Figure 3:
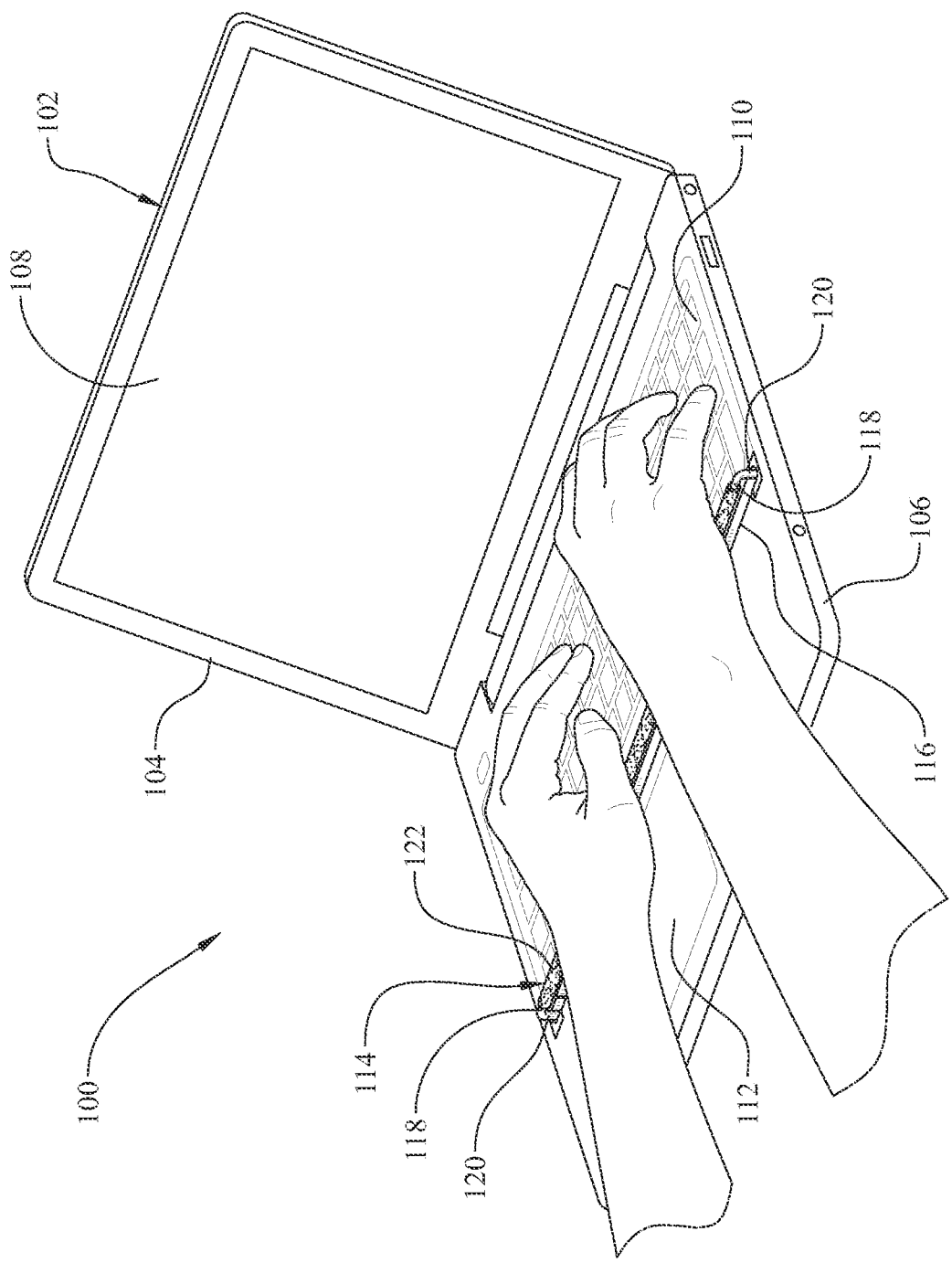
FIG. 3 presents a perspective view of the laptop of FIG. 1 and illustrating a user typing on a keyboard of the laptop while resting their hands on the support device.
Figure 4:
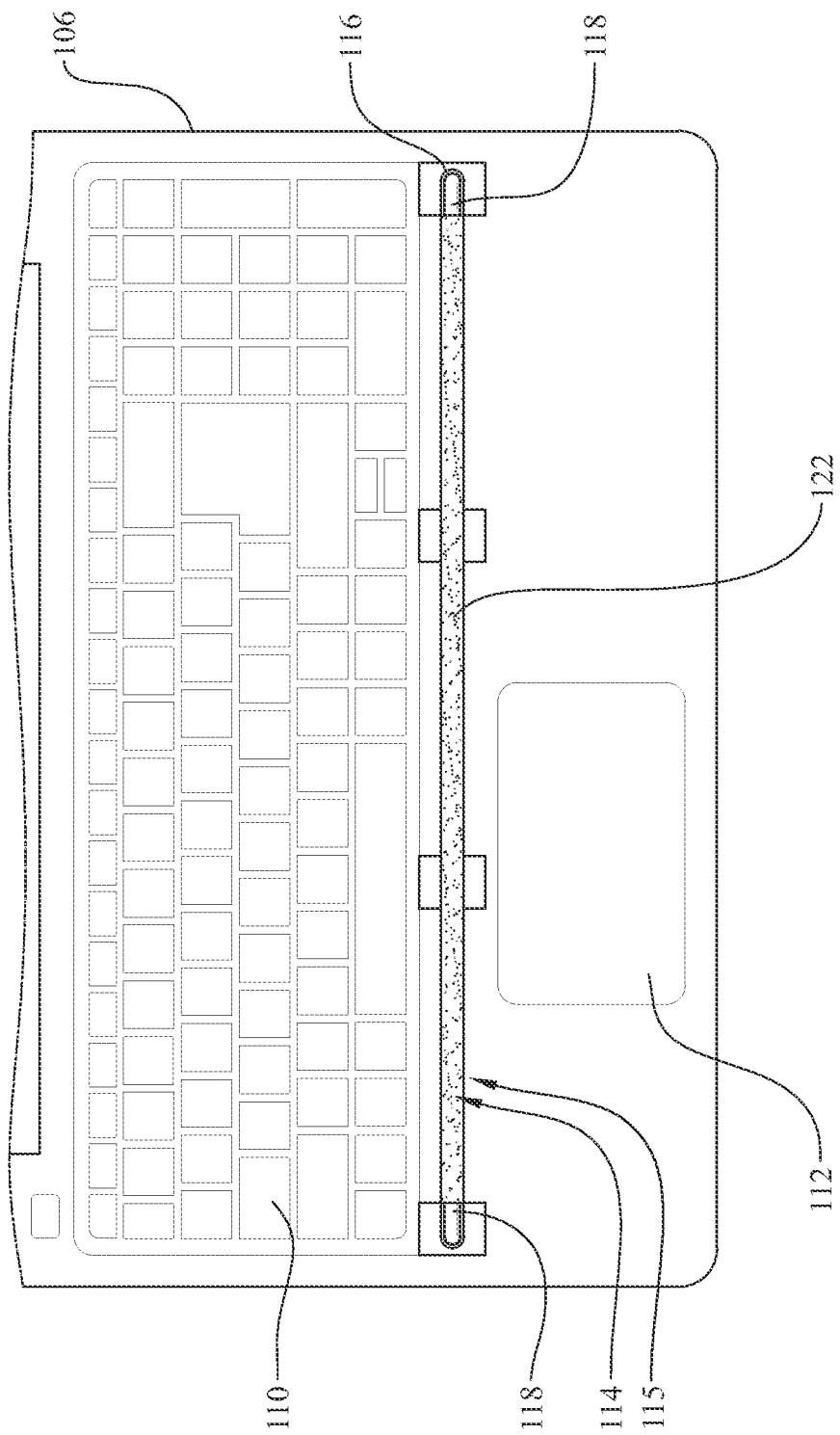
FIG. 4 presents a top view of the laptop of FIG. 1.
Figure 5:
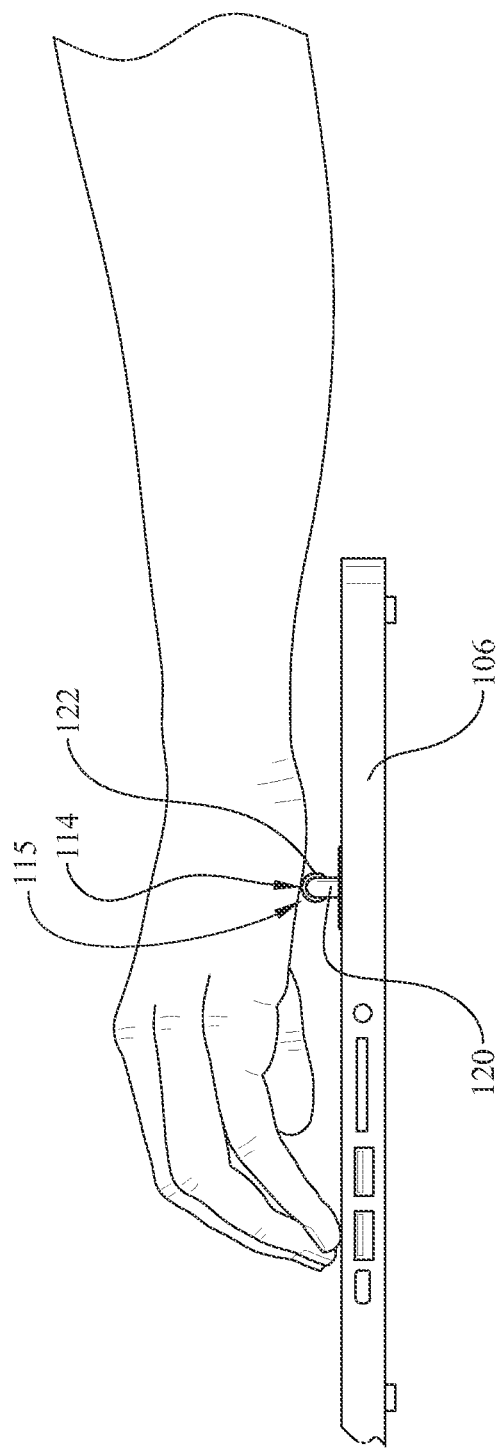
FIG. 5 presents a side view of the laptop of FIG. 1 and illustrating the user typing on the keyboard of the laptop while resting their hands on the support device.

The support device 114 is configured to transition between at least a first position presented in FIG. 1 and a second position presented in FIG. 2. In the first position, at least a portion of the support device 114, including the elongated bar 118, is protruding from the lower portion 106 such that the elongated bar 118 is located in a position elevated above keys of the keyboard 110, that is, an outermost surface of the elongated bar 118 extends further from the lower portion 106 of the body 102 than the outermost surfaces of the keys. Preferably, the support device 114 is configured to protrude from the lower portion 106 while in the first position to an extent sufficient to promote ergonomic positioning of the wrists or the hands of the user relative to the keyboard 110 while the user is typing on the keyboard 110. In the second position, a portion of or an entirety of the support device 114 is located within the compartment 116 of the lower portion 106 such that the upper portion 104 and the lower portion 106 may be folded closed without contacting the support device 114. Preferably, the outermost surfaces of the elongated bar 118 and the cushioning material 122 thereon, if present, are located flush with or below exterior surfaces of the lower portion 106 of the body 102 adjacent to an opening of the compartment 116.

Figure 6:
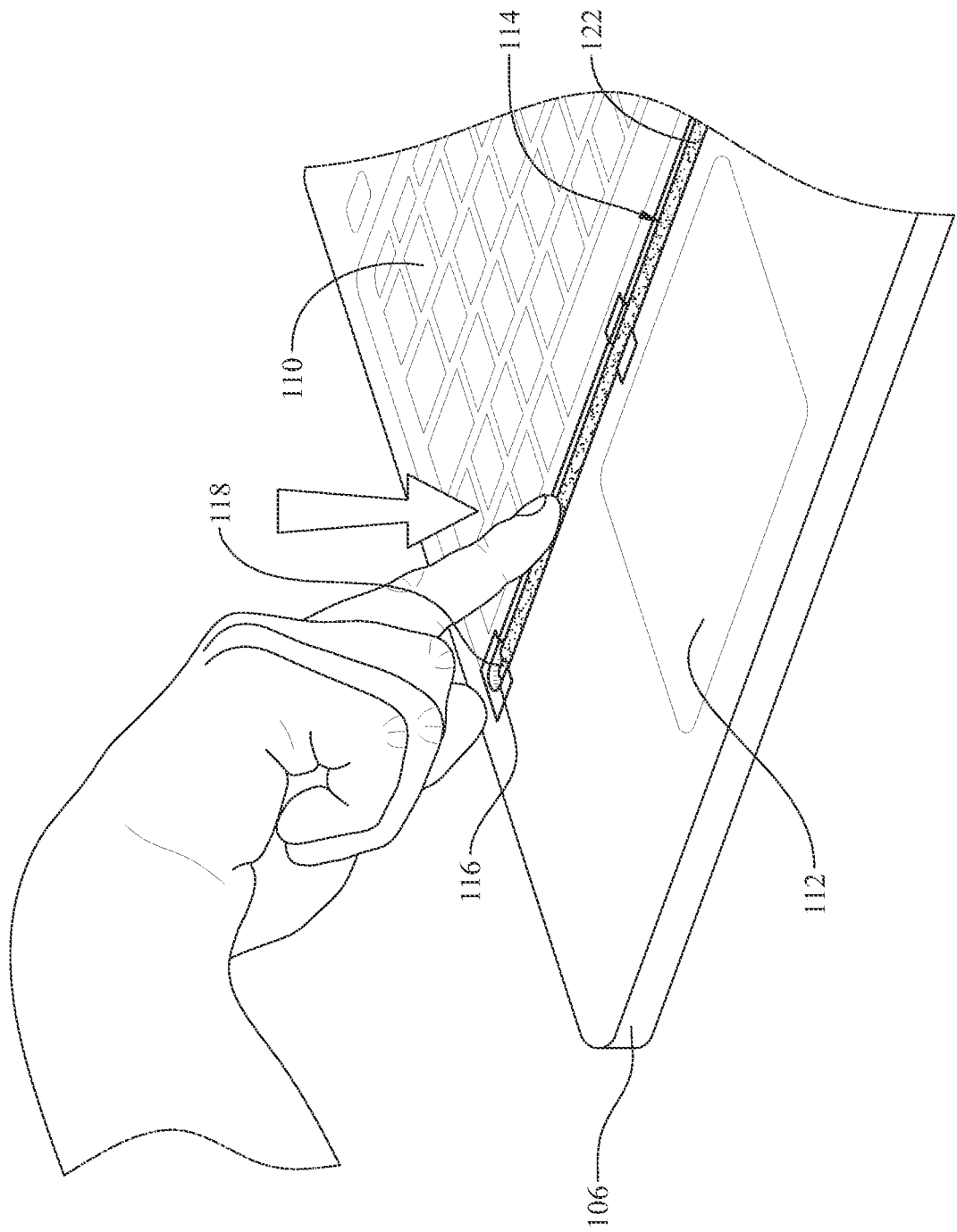
FIG. 6 presents a perspective, isolated view of the laptop of FIG. 1 and illustrates the user pressing on the support device to release the support device from a compartment of the laptop and transition the support device from the second position to the first position.
Figure 7:
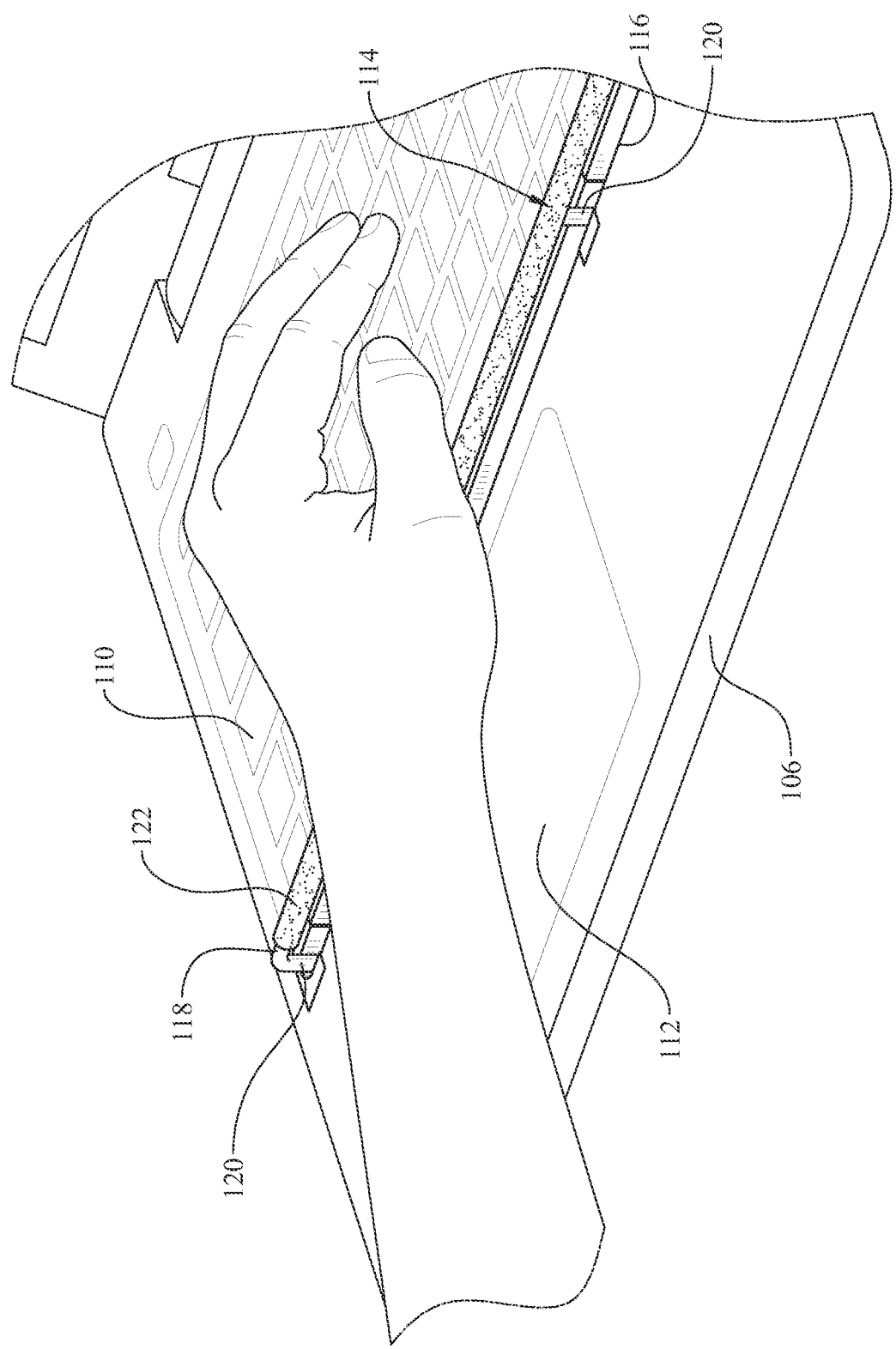
FIG. 7 presents a perspective, isolated view of the laptop of FIG. 1 and illustrates the user using the laptop computer while resting their hand on the support device.
Figure 8:
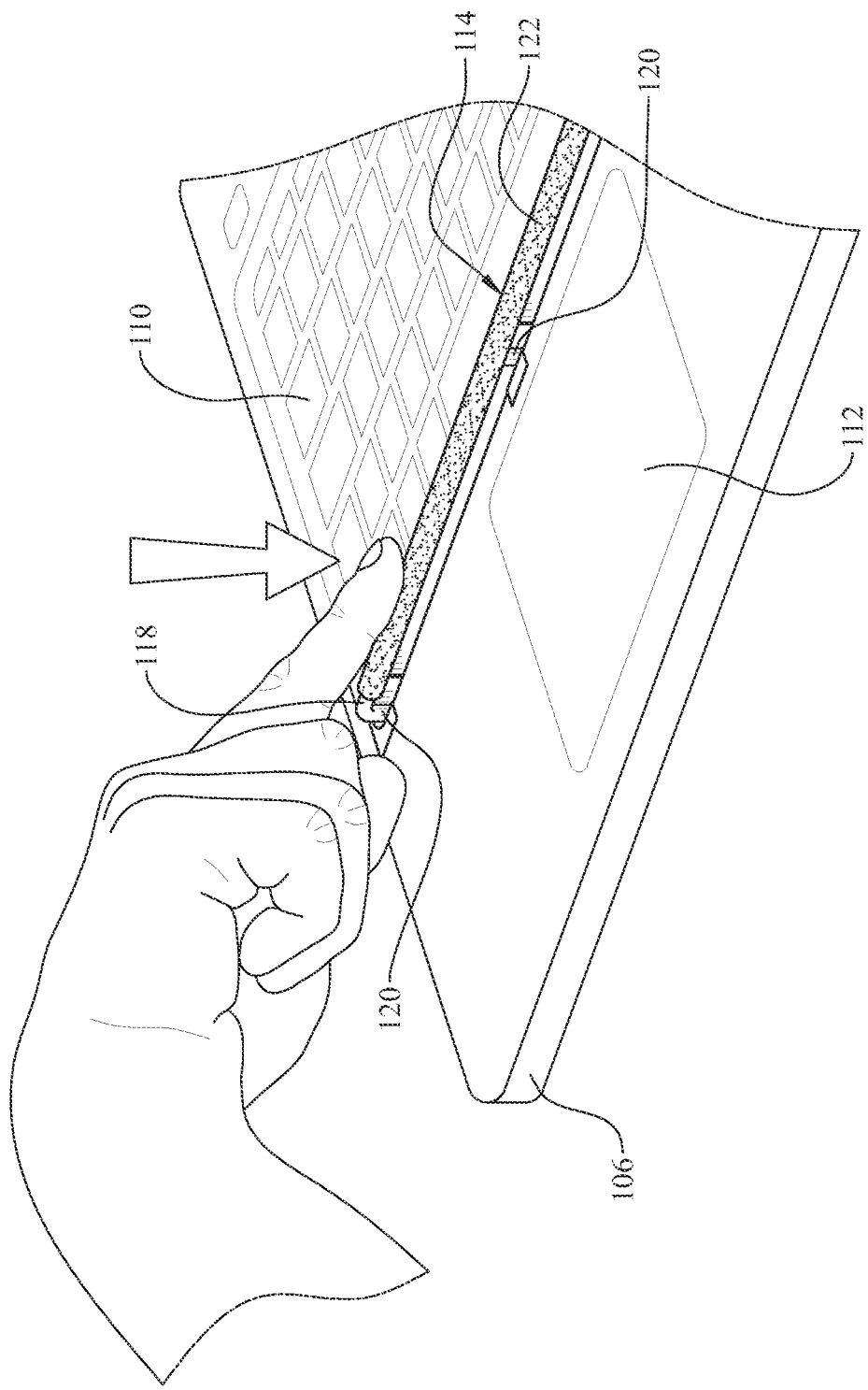
FIG. 8 presents a perspective, isolated view of the laptop of FIG. 1 and illustrates the user pressing on the support device to transition the support device from the first position to the second position and secure the support device within the compartment of the laptop.

The support device 114 may be configured to transition between the first position and the second position in various manners. As a nonlimiting example, FIGS. 6 through 8 illustrate operation of an embodiment in which the support device 114 is coupled to the lower portion 106 of the body 102 via a push-to-open mechanism (not shown). Specifically, the push-to-open mechanism is configured to secure the elongated bar 118 or portions thereof within the compartment 116 while in the second position. FIG. 6 presents a user applying a downward pressure (e.g., into or toward the compartment 116; indicated with an arrow) onto the elongated bar 118 while the support device 114 is in the second position. Upon application of sufficient pressure and/or sufficient downward displacement of the elongated bar 118, the push-to-open mechanism is configured to unlock and release the support device 114 from the second position. One or more biasing members (not shown) act on the support device 114 to force the elongated bar 118 out of the compartment 116 and maintain the support device 114 in the first position. As presented in FIG. 7, the biasing member(s) preferably apply a biasing force sufficient to support the weight of the wrists and/or the hands of the user during use of the laptop 100. FIG. 8 presents the user applying a downward pressure (indicated with an arrow) onto the elongated bar 118 while the support device 114 is in the first position. The user applies sufficient pressure to overcome the biasing member(s) and locate the support device 114 in the compartment 116. Upon application of sufficient pressure and/or sufficient downward displacement of the elongated bar 118, the push-to-open mechanism locks and once again maintains the elongated bar 118 or portions thereof in the second position.

The operation of the support device 114 presented in FIGS. 6 through 8 is merely exemplary, and other configurations are foreseeable and within the scope of the invention. For example, the support device 114 may be coupled to the body 102 via a push button mechanism (not shown) configured to secure the support device 114 within the compartment 116 while in the second position, unlock and release the support device 114 from the second position upon actuation of a push button (not shown) located on the body 102 wherein the support device 114 is extended via one or more biasing members, maintain the support device 114 in the first position with the biasing member(s) with a biasing force sufficient to support the weight of the wrists and/or the hands of the user, and lock and secure the support device 114 in the second position upon pressure applied to the support device 114 that is sufficient to overcome biasing member(s) and locate the support device 114 within the compartment 116. In yet another example, the support device 114 may be coupled to the body 102 via a manual mechanism (e.g., pivoting joints; not shown) configured to be manually actuated between the first position and the second position while providing sufficient support to maintain the support device 114 in the first position while the wrists and/or the hands of the user rests thereon. In this example, the support device 114 may be configured to pivot relative to the lower portion 106 of the body 102 to extend from the compartment 116 rather than "popping up" in response to a biasing force.

The laptop 100 provides for a method of use thereof in a manner that is intended to reduce the likelihood of certain computer related injuries. The method may include transitioning the support device 114 between the first position and the second position and typing on the keyboard 110 while simultaneously supporting a wrist or a hand on the support device 114 while the support device 114 is in the first position. Preferably, the method includes supporting the wrist or the hand on the support device 114 while in the first position such that the wrist or the hand is in an ergonomic position relative to the keyboard 110 while the user is typing on the keyboard 110. While the support device 114 is in the second position, the method may include folding the upper portion 104 and the lower portion 106 of the body 102 to close the laptop 100.

The method of transitioning the support device 114 between the first and second positions may vary depending on the specific configuration of the support device 114. For examples that include a push-to-open mechanism, the method may include releasing the support device 114 from the second position by pressing on the support device 114, maintaining the support device 114 in the first position with a biasing member sufficient to support the wrist or the hand, and securing the support device 114 in the second position by pressing on the support device 114 sufficient to overcome the biasing member and locate the support device 114 in the compartment 116. For examples that include a push button mechanism, the method may include releasing the support device 114 from the second position by actuating a push button located on the body 102, maintaining the support device 114 in the first position with a biasing member sufficient to support the wrist or the hand, and securing the support device 114 in the second position by pressing on the support device 114 sufficient to overcome the biasing member and locate the support device 114 in the compartment 116. For examples that include a manual mechanism, the method may include manually actuating the support device 114 between the first position and the second position while providing sufficient support to maintain the support device 114 in the first position while the wrist or the hand rests thereon.

The illustrations of FIGS. 9-14 show a laptop computer, hereinafter referred to as laptop 200, in accordance with another illustrative embodiment of the present invention. Similarly to previous embodiments, the laptop 200 includes a clam shell-type body 210 having an upper portion 212 pivotally coupled to a lower portion 214 that may be folded shut for transportation. The lower portion 214 may be formed as a generally planar or flat body arranged along a front-to-back direction x and a left-to-right or transverse direction y. The front-to-back direction x and the transverse direction y are generally perpendicular to one another and further perpendicular to a vertical direction z, such that directions x, y, z form an orthogonal axis set. The upper and lower portions 212 and 214 may be pivotable relative to one another about a rotation axis 216, which is preferably arranged in the transverse direction y. A display screen 218 is integrated into the upper portion 212 of the body 210, and an alphanumeric keyboard 220 and a pointing device 222 (e.g., a touch pad or a track pad) are integrated into the lower portion 214 of the body 210. A central, longitudinal axis of the keyboard 220 is parallel to a central, longitudinal axis of the display screen 218; for example, as in the previous embodiment, both central longitudinal axes are arranged in the transverse direction y. The pointing device 222 is generally centrally located between the user and the keyboard 220 during use of the laptop 200. In addition, the laptop 200 includes a support device 240 integrated into the lower portion 214 of the body 210 between the keyboard 220 and the pointing device 222 that is configured to support one or both of a user's wrists and/or hands while in the user is typing on the keyboard 220. As with previous embodiments, the support device 240 is selectively receivable within or deployable from a recess or compartment 230 formed in the lower portion 214 of the body 210.

Figure 9:
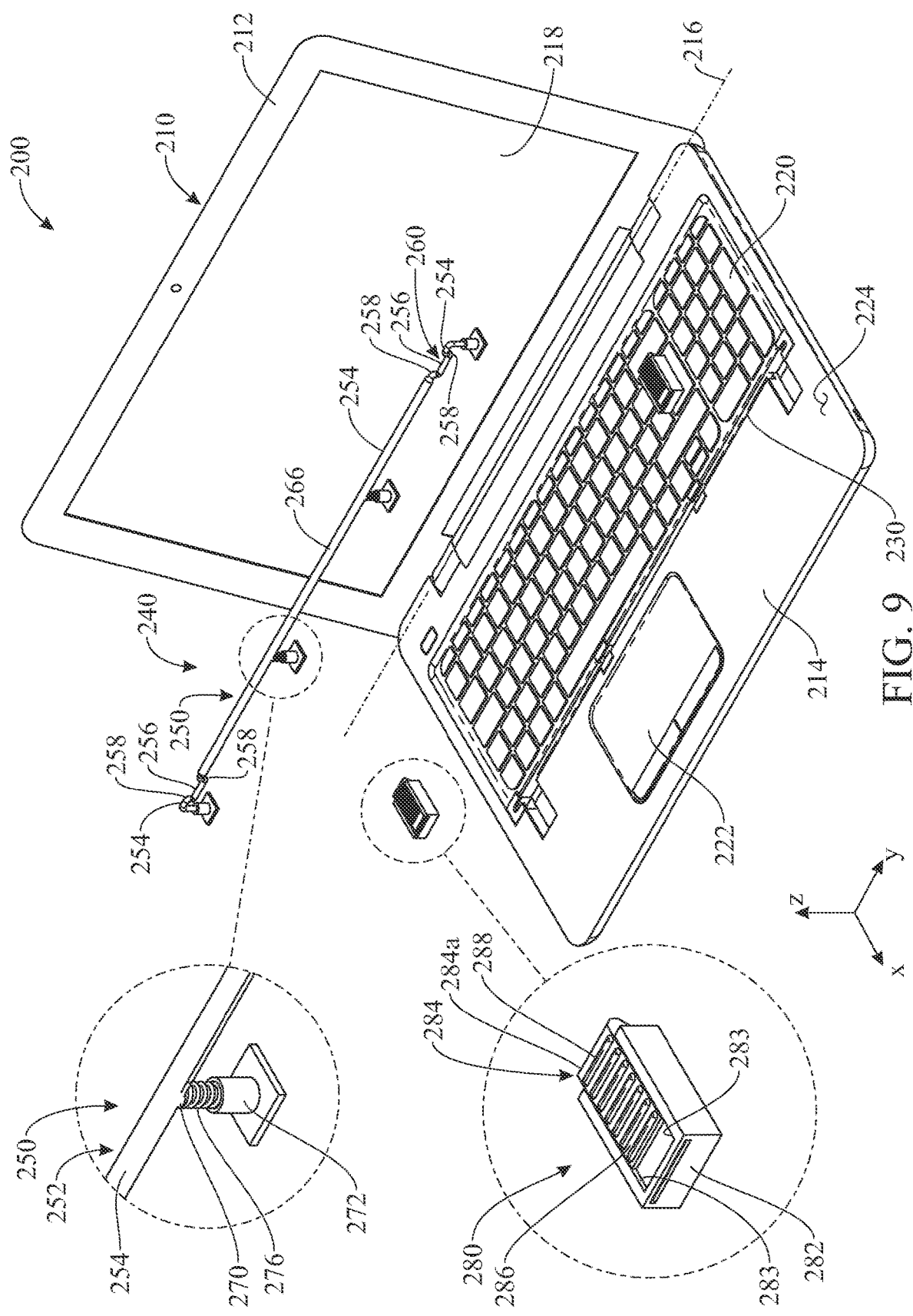
FIG. 9 presents an exploded top, front isometric view of a laptop computer in accordance with another illustrative embodiment of the present invention.

As shown in FIG. 9, Similarly to previous embodiments, the support device 240 includes a frame 250 comprising an elongated bar 252 that extends across the lower portion 214 of the body 210 of the laptop 200. The elongated bar 252 is elongately formed, preferably along the transverse direction y, as shown. The elongated bar 252 may include one or more elongated, support segments 254 which may be elongately formed along a central, longitudinal axis. In some embodiments, the support segments 254 may be rectilinear, and more preferably parallel to the central, longitudinal axes of the keyboard 220 and the display screen 218 (e.g., arranged in the transverse direction y). The elongated bar 252 may further include at least one, and more preferably, at least two locking segments 256 arranged lower than the support segments 254 for purposes described hereinafter; in preferred embodiments, such as the present embodiment, the elongated bar 252 may specifically include a pair of locking segments 256 arranged in spaced-apart relationship with one another at opposite ends of the elongated bar 252. One or more connecting segments 258 may interconnect the locking segment(s) 256 and the support segment(s) 254. For example, in the depicted embodiment, each locking segment 256 is connected to adjacent support segment(s) 254 by a pair of connecting segments 258, with the locking segment 256 and the pair of connecting segments 258 forming a generally U-shaped arrangement and defining a space 260 therebetween, the space 260 arranged above the locking segment 256.

In some embodiments, a cushioning material 266 may be located on an exterior surface of the elongated bar 252 or portions thereof that are configured to contact the wrists or the hands of the user when resting on the support device 240. For example, in the present embodiment, the cushioning material 266 is provided along a central, main, or longest support segment 254 which extends between the pair of locking segments 256. Such cushioning material 266 may be permanently or releasably coupled to the elongated bar 252.

As further shown in FIG. 9, the elongated bar 252 includes one or more, and more preferably, a plurality of legs 270 that extend downward (preferably in the vertical direction z) into the compartment 230 formed in the lower portion 214 of the laptop 200 and couple the frame 250 therein. In the depicted embodiment, the legs 270 extend downward from, and more preferably, perpendicularly from, the upper or support segments 254. The legs 270 are movably received within respective columns 272, each column defining or providing a seating surface 274 for a respective biasing member 276 (e.g., compression spring). In some embodiments, each biasing member 276 (e.g., compression spring) may be positioned wrapped or coiling around a corresponding leg 276, promoting compactness, stability, and ease of assembly. The columns 272 are fixedly mounted to the lower portion 214 of the body 210 of the laptop 200, such as inside the compartment 230, such that the seating surfaces 274 are fixed or non-vertically movable. The biasing member 276 extends between the corresponding seating surface 274 and the elongated bar 252 and is configured to exert an upward force on the elongated bar 252 to bias the elongated bar 252 to shift upward.

As further shown in FIG. 9, the support device 240 further includes one or more locking members 280 configured to selectively engage the elongated bar 252 for purposes described hereinafter. For example, the depicted embodiment specifically comprises two locking members 280, each configured to selectively engage a respective one of the locking segments 256 of the elongated bar 252. The locking member or members 280 may be located adjacent to the elongated bar 252, which in turn may extend between the pointing device 222 and the keyboard 220.

The locking member 280 may include a housing 282 and a latch member 284. As shown for instance in FIGS. 10 and 12, the housing 282 may be fixedly mounted to the lower portion 214 of the body 210 of the laptop 200, such as inside a second compartment 232 provided in the lower portion 214, and preferably not protruding outward from the compartment 230. In some embodiments, such as the present embodiment, the second compartment 232 may be in spatial communication with (i.e. form part of) the compartment 230 which receives the frame 250. The latch member 284 may be movably mounted to the housing 282 and movable between a locking position (FIGS. 12 and 14) and an unlocking position (FIG. 13), for purposes described hereinafter. In preferred embodiments, such as the present embodiment, the latch member 284 is more specifically slidably mounted to the housing 282, such as along a pair of side tracks 283, and is slidably movable along and with respect to the housing 282 between the locking and unlocking positions. The latch member 284 may include an upper side 286 which may be engaged by the user's finger or fingers to displace the latch member 284; in some embodiments, the upper side 286 may include one or more outer textures, ridges, grooves and/or other nonslip feature(s) 288 configured to increase a friction between the upper side 286 and the user's finger(s) thereby facilitating a manual sliding of the latch member 284. The one or more nonslip features 288 may be arranged at or generally flush with a top side 224 of the upper portion 212 of the body 210 of the laptop 200.

Figure 12:
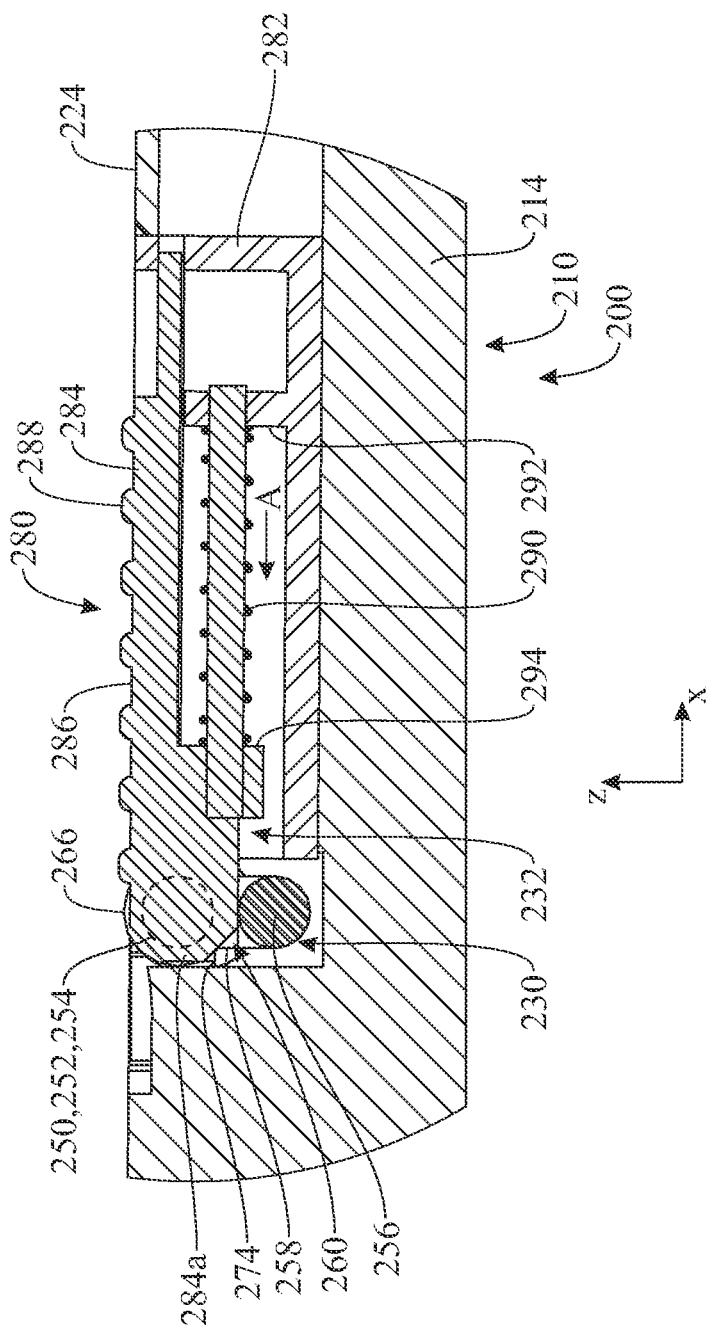
FIG. 12 presents a cross-sectional side elevation view, the section taken along section plane 12-12 indicated in FIG. 10 and depicting an enlarged view of the support device in the lowered and locked configuration.
Figure 13:
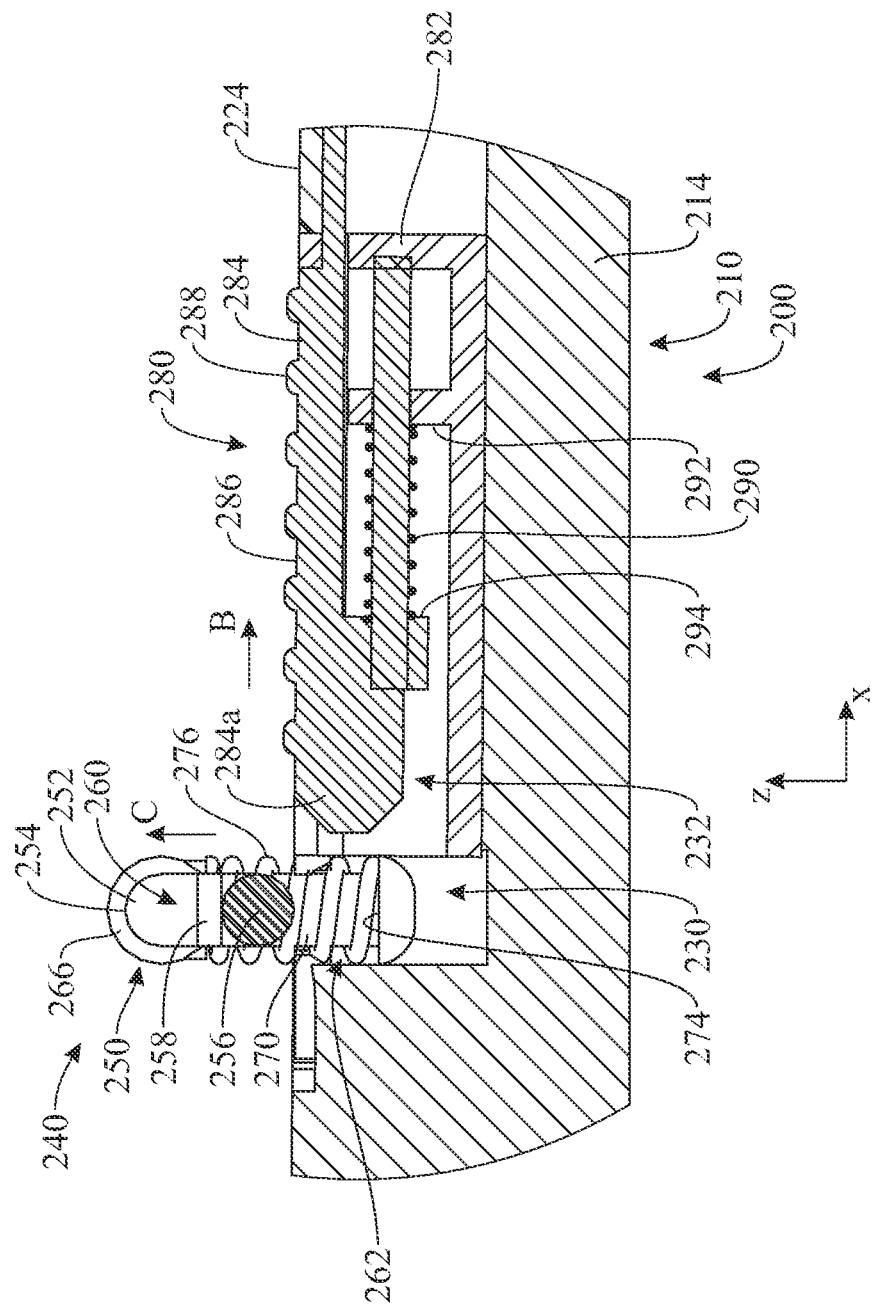
FIG. 13 presents a cross-sectional side elevation view, similar to FIG. 10, showing the support device in a raised and unlocked configuration.
Figure 14:
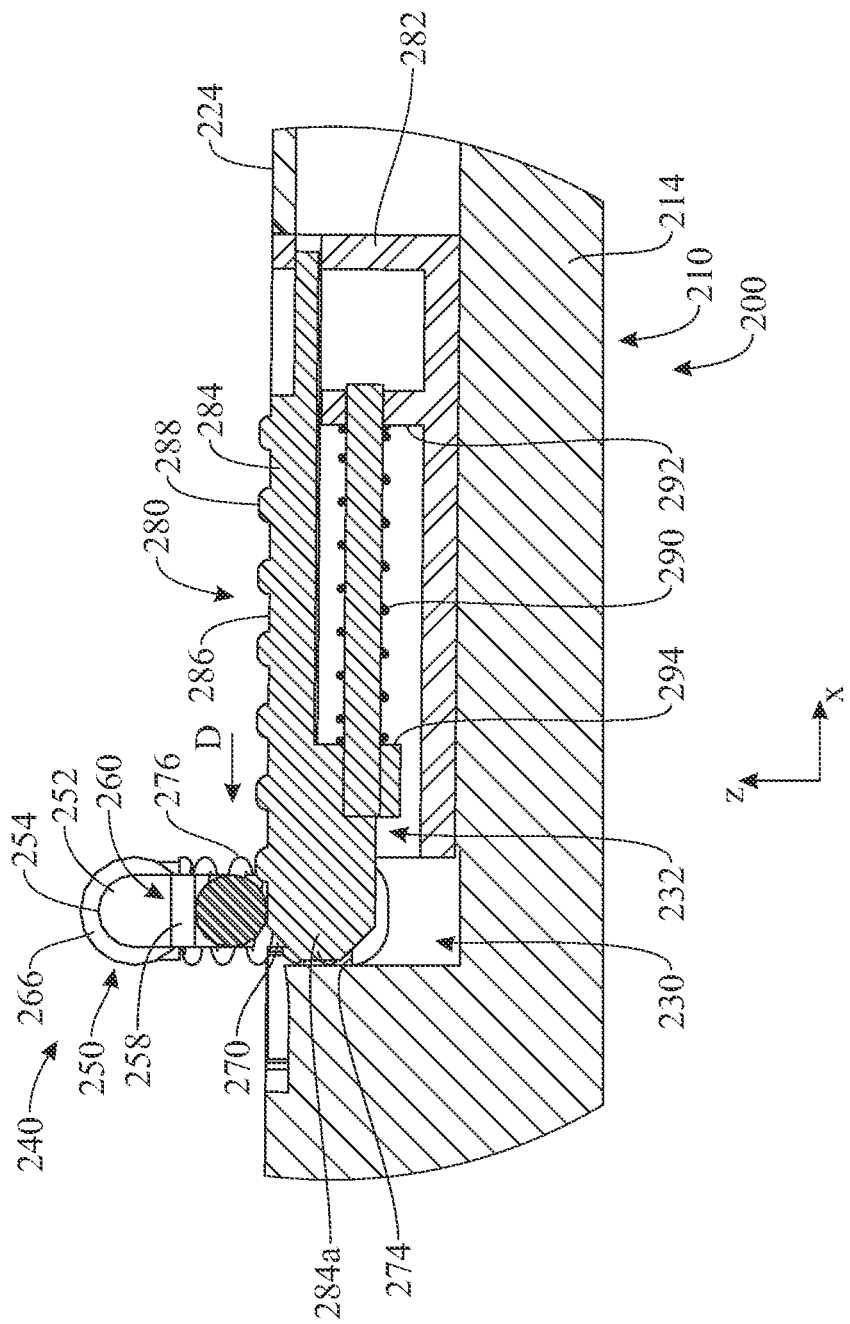
FIG. 14 presents a cross-sectional side elevation view, similar to FIGS. 10 and 11, showing the support device in the raised and locked configuration of FIG. 11.

As shown in FIGS. 12-14, the locking member 280 may further include a biasing member 290 (e.g., compression spring). The biasing member 290 may extend between a seating surface 292 comprised in the housing 282 and a seating surface 294 comprised in the latch member 284, and may be configured to bias the seating surfaces 294, 292 away from one another and thereby push the seating surface 294 (and thus the latch member 284) forward with respect to the fixed housing 282.

In operation of the laptop 200 and the support device 240 comprised therein, the support device 240 may adopt different functional positions shown and described with reference to FIGS. 10-14. The support device 240 may transition between the different positions as a result of a user manually operating the support device 240 and/or the spring biasing mechanisms automatically operating the support device 240 as described hereinafter.

Figure 10:
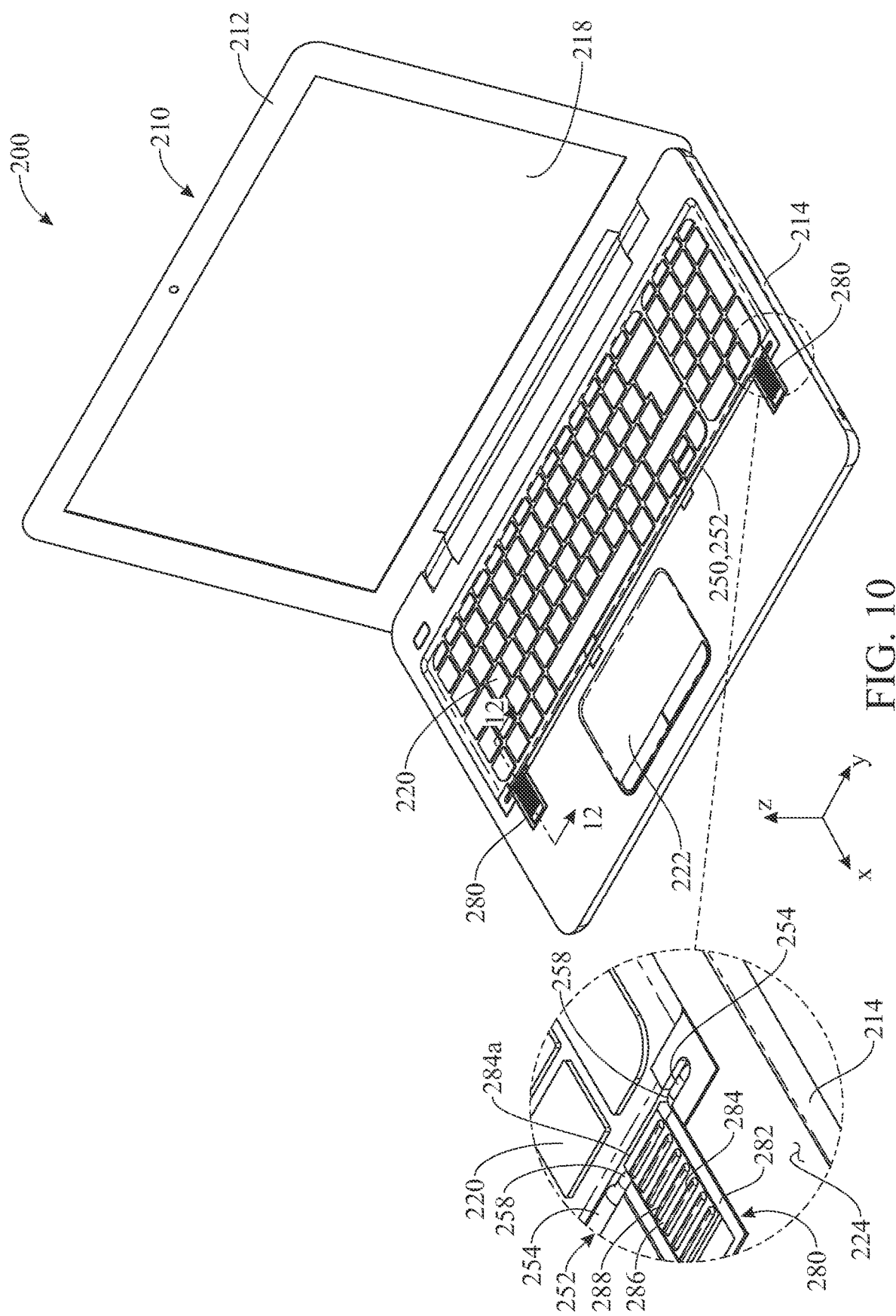
FIG. 10 presents a top, front isometric view of the laptop computer of FIG. 9, with a support device of the laptop computer shown in a lowered and locked configuration.
Figure 11:
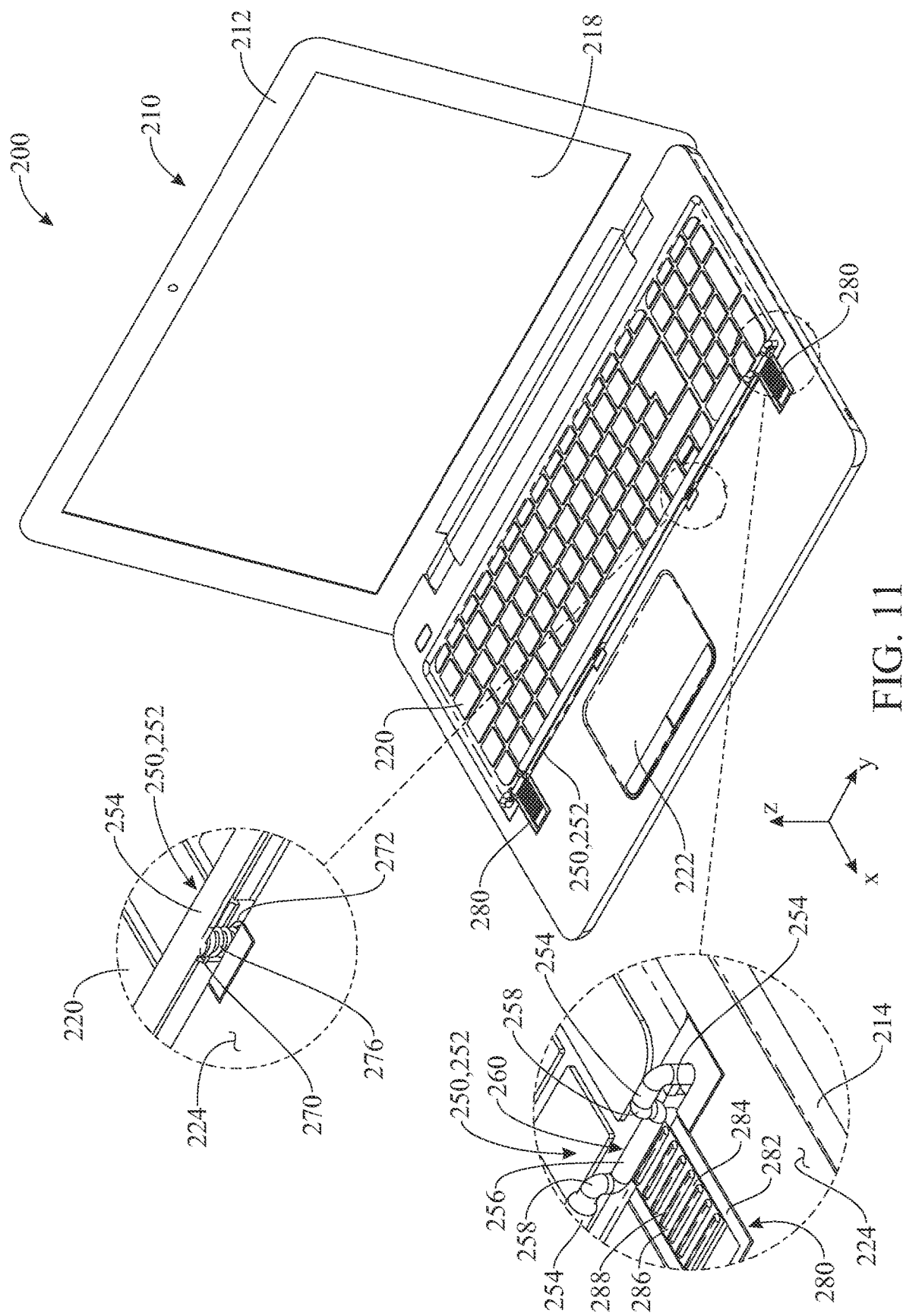
FIG. 11 presents a top, front isometric view of the laptop computer of FIG. 9, similar to FIG. 10, with a support device of the laptop computer instead shown in a raised and locked configuration.

For example, the support device 240 may be initially arranged in a lowered and locked configuration, shown in FIGS. 10 and 12. In this configuration, the frame 250 is arranged in a relatively low, or lowered, position such that the frame 250 is generally entirely received within the compartment 230 of the lower portion 214 of the body 210 of the laptop 200. Preferably, the outermost surfaces of the elongated bar 252 and the cushioning material 266 thereon, if present, are located flush with or below the top side 224 or other exterior surfaces of the lower portion 214 of the body 210 adjacent to an opening of the compartment 230. In normal usage conditions, the frame 250 may have been shifted downward to this lowered position by manually pushing downward on the frame 250, such as on the cushioning material 266 which covers the support segments 254, to overcome the upward biasing force exerted by the biasing members 276. With the frame 250 in the lowered position, the space 260 located above each one of the locking segments 256 has become aligned with latch member 284 of a corresponding one of the locking members 280, and the biasing member 290 of the locking member 280 has displaced the latch member 284 towards the frame 250, as indicated by arrow A, to position the latch member 284 in the locking position. In this locking position of the latch member 284, a leading end 284 of the latch member 284 has penetrated the space 260 and extends over and at least partially across the locking segment 256, as best shown in FIG. 12; as a result of this, the leading end 284a of the latch member 284 blocks a vertical displacement of the latch member 284 and thereby locks the frame 250 in the lowered position as shown in FIGS. 10 and 12.

In this lowered and locked configuration of the support device 240, the biasing members 276 at the legs 270 of the frame 250 are loaded (compressed) and exert an upward pushing force on the elongated bar 252, but the elongated bar 252 is not able to shift upward as a result of the latch members 284 being arranged in the locking position as described. In turn, the biasing member 290 (e.g., compression springs) of each locking member 280 exerts a forward pushing force (in the direction of arrow A) on the seating surface 294 which maintains the latch member 284 in the locking position, as best shown in FIG. 12. In this way, the support device 240 of the present embodiment is locked in a lowered configuration in which the frame 250 is elastically loaded and stowed away inside the lower portion 214 of the body 210 of the laptop 200, as best shown in FIG. 10, with the locking members 280 protruding only slightly, or not protruding, from the top side 224 of the lower portion 214 thereby not interfering with normal opening and closing of the upper portion 212 relative to the lower portion 214 about the rotation axis 216.

From the lowered and locked configuration (FIGS. 10 and 12), and with reference now to FIG. 13, a user may operate the locking members 280 to unlock and deploy the frame 250 in order to support his or her wrists, arms, or hands thereon. More specifically, the user may manually exert a rearward force (indicated by arrow B) on the upper side 286 of the latch members 284, which may be facilitated by the optional nonslip feature(s) 288 on the upper side 286, the manual force sufficient to overcome the forward biasing force exerted by the biasing member 290 and cause each latch member 284 to slide rearward along the tracks 283 and relative to the corresponding housing 282 in the direction of arrow B. A sufficient rearward displacement of the latch members 284 along the housings 282 eventually causes the locking member 280 to adopt or reach the unlocking position, in which the leading end 284a of the latch member 284 has been retracted from the space 260 above the locking element 256 and thus become disengaged from the locking segment 256, thereby 'freeing' the frame 250. In consequence, the frame 250 is now able to rise from the compartment 230 as a result of the upward force exerted by the compressed or loaded, biasing members 276, indicated by arrow C. The support device 240 is now arranged in a raised and unlocked configuration, shown in FIG. 13. In the raised and unlocked configuration, the frame 250 is elevated, the biasing members 290 of the locking members 280 are compressed or loaded, and each retracted latch member 284 is now aligned with a second space 262 located below the corresponding locking segment 256 of the frame 250.

From the raised and unlocked configuration (FIG. 13), the user may release the latch members 284 and allow the compressed or loaded, biasing members 290 to automatically slide the latch members 284 forward relative to the corresponding housing 282 as indicated by arrow D in FIG. 14. As a result of this forward sliding, the leading end 284a of each latch member 284 penetrates the second space 262 (FIG. 13) and extends below and at least partially across the corresponding locking segment 256, as shown in FIG. 14, thereby blocking a downward movement or lowering of the frame 250. The support device 240 is thus arranged in a raised and locked configuration, shown in FIGS. 11 and 14, in which the frame 250 is raised, and the one or more support segments 254 of the frame 250 are elevated from the top side 224 of the upper portion 212 of the body 210 of the laptop 200 and provide an elevated, ergonomic support for the user's wrists, arms, or hands. In order to return to the lowered and locked configuration of FIGS. 10 and 12, the user may simply and easily shift the latch members 284 rearward to the unlocking position (FIG. 13) and then push the frame 250 downward to overcome the biasing members 276 as described heretofore.

The laptop 200 provides for a method of use thereof in a manner that is intended to reduce the likelihood of certain computer related injuries. The method may include transitioning the support device 240 between the lowered and locked configuration (FIGS. 10 and 12) and the raised and locked configuration (FIGS. 11 and 14) and typing on the keyboard 220 while simultaneously supporting a wrist or a hand on the support device 240 while the support device 240 is in the raised and locked configuration. Preferably, the method includes supporting the wrist or the hand on the support device 240 while in the raised and locked configuration such that the wrist or the hand is in an ergonomic position relative to the keyboard 220 while the user is typing on the keyboard 220. While the support device 240 is in the lowered and locked configuration, the method may include folding the upper portion 212 and the lower portion 214 of the body 210 to close the laptop 200.

Alternative embodiments are contemplated in addition to the embodiments(s) shown and/or described herein. For example, the support device 114, 240 may be integrated into various types of laptop computers with various configurations, including but not limited to laptop computers having detachable upper and lower portions (e.g., 2-in-1 PCs). Further, the laptop 100, 200 is not limited to any particular internal components and may have varying functionality, such as varying processing and data storage capabilities.

In certain examples, the laptop 100, 200 may include one or more pointing devices of types other than touch pads, such as but not limited to a pointing stick or trackpoint, a trackball, a stylus, or a touchscreen. In such examples, the support device 114, 240 may not be located between the pointing device 112, 222 and the keyboard 110, 220.

In some examples, the laptop 100, 200 may include two or more support devices 114, 240, and/or the support device 114, 240 may have shapes, sizes, or structures different than those described herein and presented in the figures.

Various materials may be used in the construction of the support device 114, 240, including certain polymeric materials, ceramic materials, metallic materials, or combinations thereof.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A laptop computer, comprising:
   a body, comprising a lower portion and a keyboard integrated into the lower portion; and
   a support device integrated into the body adjacent to the keyboard, the support device comprising:
   an elongated frame, configured for the resting thereon of at least a wrist or a hand of a user,
   one or more first biasing members, configured to apply an upward force on the elongated frame to cause a rising of the elongated frame with respect to the lower portion of the body, and
   one or more locking members, carried by the lower portion of the body, each locking member comprising a movable, respective latch member operable to change positions with respect to the lower portion of the body; wherein the support device is configured to selectively adopt:
  a lowered and locked configuration, in which the elongated frame is at least partially received within a compartment of the lower portion of the body, and the latch member of each locking member of the one or more locking members engages the elongated frame and blocks said rising of the elongated frame thereby retaining the elongated frame in place, and
  a raised and locked configuration, in which the elongated frame is elevated with respect to the lowered and locked configuration and at least part of the elongated frame protrudes upward from the lower portion of the body, and the latch member of each locking member of the one or more locking members engages the elongated frame and blocks a lowering of the elongated frame thereby retaining the elongated frame in place, and further in which said at least part of the elongated frame provides a support for at least a wrist or a hand of a user while the user is typing on the keyboard.

2. The laptop computer of claim 1, wherein the latch member of each locking member is spring-biased towards engagement with the elongated frame to position the support device in the lowered and locked configuration and the raised and locked configuration.

3. The laptop computer of claim 1, wherein the support device is configured to further adopt:
  an unlocked configuration, in which the latch member of each locking member of the one or more locking members is disengaged from the elongated frame, and the elongated frame is able to rise and descend with respect to the lower portion of the body to switch the support device between the lowered and locked configuration and the raised and locked configuration.

4. The laptop computer of claim 3, wherein the latch member of each locking member is manually operable to disengage from the elongated frame to position the support device in the unlocked configuration.

5. The laptop computer of claim 1, wherein the support device extends along and generally parallel to the keyboard.

6. The laptop computer of claim 1, wherein the support device is positioned between the keyboard and a pointing device comprised in the body.

7. The laptop computer of claim 1, wherein said at least part of the elongated frame comprises a cushioning material.

8. The laptop computer of claim 1, wherein the elongated frame comprises an elongated bar extending along the keyboard and one or more legs extending downward from the elongated bar, wherein said at least part of the elongated frame comprises said elongated bar.

9. The laptop computer of claim 8, wherein each first biasing member of the one or more first biasing members is positioned at a respective leg of the one or more legs of the elongated frame.

10. The laptop computer of claim 9, wherein each first biasing member of the one or more first biasing members comprises a respective compression spring wrapped around the respective leg.

11. The laptop computer of claim 8, wherein the elongated bar comprises one or more support segments and one or more locking segments arranged lower than the one or more support segments, wherein said at least part of the elongated frame comprises the one or more support segments, and further wherein the latch member of each locking member of the one or more locking members engages a locking segment of the one or more locking segments in both the lowered and locked configuration and the raised and locked configuration.

12. The laptop computer of claim 11, wherein each locking segment of the one or more locking segments is connected to the one or more support segments by a pair of connecting portions forming a U-shaped arrangement with said each locking segment, and further wherein the latch member of each locking member of the one or more locking members engages a respective locking segment of the one or more locking segments in both the lowered and locked configuration and the raised and locked configuration.

13. The laptop computer of claim 1, wherein the one or more locking members comprise a pair of locking members arranged in spaced-apart relationship with one another and at opposite ends of the elongated frame.

14. The laptop computer of claim 1, wherein the latch member of said each locking member is slidably movable with respect to the lower portion of the body.

15. The laptop computer of claim 14, wherein the latch member of said each locking member is slidable towards the keyboard to engage the latch member of said each locking member with the elongated frame in both the lowered and locked configuration and the raised and locked configuration.

16. The laptop computer of claim 1, wherein each locking member of the one or more locking members comprises a respective, second biasing member configured to apply a force on the latch member to cause the latch member to engage with the elongated frame in both the lowered and locked configuration and the raised and locked configuration.

17. The laptop computer of claim 1, wherein each locking member of the one or more locking members comprises a respective housing mounted within the lower portion of the body, wherein the latch member of said each locking member is movably mounted to the housing of said each locking member.

18. The laptop computer of claim 17, wherein the latch member is slidably mounted to the housing and is slidable along the housing and towards the keyboard to engage the latch member with the elongated frame in both the lowered and locked configuration and the raised and locked configuration.

19. A laptop computer, comprising:
  a body, comprising a lower portion and a keyboard integrated into the lower portion; and
  a support device integrated into the body adjacent to the keyboard, the support device comprising:
    an elongated frame, configured for the resting thereon of at least a wrist or a hand of a user,
    one or more first biasing members, configured to apply an upward force on the elongated frame to cause a rising of the elongated frame with respect to the lower portion of the body, and
    one or more locking members, carried by the lower portion of the body, each locking member comprising a movable, respective latch member operable to change positions with respect to the lower portion of the body; wherein
  the support device is configured to selectively adopt:
    a lowered and locked configuration, in which the elongated frame is at least partially received within a compartment of the lower portion of the body, and the latch member of each locking member of the one or more locking members engages the elongated frame and blocks said rising of the elongated frame thereby retaining the elongated frame in place, a raised and locked configuration, in which the elongated frame is elevated with respect to the lowered and locked configuration and at least part of the elongated frame protrudes upward from the lower portion of the body, and the latch member of each locking member of the one or more locking members engages the elongated frame and blocks a lowering of the elongated frame thereby retaining the elongated frame in place, and further in which said at least part of the elongated frame provides a support for at least a wrist or a hand of a user while the user is typing on the keyboard, and an unlocked configuration, in which the latch member of each locking member of the one or more locking members is disengaged from the elongated frame, and the elongated frame is able to rise and descend with respect to the lower portion of the body to switch the support device between the lowered and locked configuration and the raised and locked configuration; wherein the latch member of each locking member is spring-biased towards engagement with the elongated frame to position the support device in the lowered and locked configuration and the raised and locked configuration.

20. A laptop computer, comprising:

a body, comprising a lower portion and a keyboard integrated into the lower portion; and a support device integrated into the body adjacent to the keyboard, the support device comprising:

an elongated frame, configured for the resting thereon of at least a wrist or a hand of a user, one or more first biasing members, configured to apply an upward force on the elongated frame to cause a rising of the elongated frame with respect to the lower portion of the body, and one or more locking members, carried by the lower portion of the body, each locking member comprising a movable, respective latch member operable to change positions with respect to the lower portion of the body; wherein the support device is configured to selectively adopt:

a lowered and locked configuration, in which the elongated frame is at least partially received within a compartment of the lower portion of the body, and the latch member of each locking member of the one or more locking members engages the elongated frame and blocks said rising of the elongated frame thereby retaining the elongated frame in place, a raised and locked configuration, in which the elongated frame is elevated with respect to the lowered and locked configuration and at least part of the elongated frame protrudes upward from the lower portion of the body, and the latch member of each locking member of the one or more locking members engages the elongated frame and blocks a lowering of the elongated frame thereby retaining the elongated frame in place, and further in which said at least part of the elongated frame provides a support for at least a wrist or a hand of a user while the user is typing on the keyboard, and an unlocked configuration, in which the latch member of each locking member of the one or more locking members is disengaged from the elongated frame, and the elongated frame is able to rise and descend with respect to the lower portion of the body to switch the support device between the lowered and locked configuration and the raised and locked configuration; wherein the latch member of each locking member is spring-biased towards engagement with the elongated frame to position the support device in the lowered and locked configuration and the raised and locked configuration; and further wherein the latch member of each locking member is manually operable to disengage from the elongated frame to position the support device in the unlocked configuration.

\* \* \* \* \*